United States Patent [19]

Fukushima et al.

[11] Patent Number: 5,136,150
[45] Date of Patent: Aug. 4, 1992

[54] IMAGE SENSOR HAVING LIGHT GUIDES FOR COMMUNICATION WITH IMAGE PLANE

[75] Inventors: Tetsuo Fukushima, Katano; Kenichiro Suetsugu, Amagasaki; Tokuhito Hamane, Nara; Junji Ikeda, Ikoma; Yukio Maeda, Hirakata, all of Japan

[73] Assignee: Matsushita Electric Industrial Co., Ltd., Osaka, Japan

[21] Appl. No.: 632,735

[22] Filed: Dec. 26, 1990

[30] Foreign Application Priority Data

Dec. 28, 1989 [JP] Japan ................. 1-342636

[51] Int. Cl.⁵ .............................. H01J 40/14
[52] U.S. Cl. ...................... 250/208.1; 250/227.20; 358/484
[58] Field of Search ........... 250/208.1, 227.20, 227.28; 350/96.27; 357/30 M; 358/484

[56] References Cited

U.S. PATENT DOCUMENTS

| | | | |
|---|---|---|---|
| 4,257,071 | 3/1981 | Lamb | 358/484 |
| 4,317,137 | 2/1982 | Tompkins | 358/484 |
| 4,671,612 | 6/1987 | Sakurai et al. | 250/227.20 |

Primary Examiner—David C. Nelms
Assistant Examiner—K. Shami
Attorney, Agent, or Firm—Wenderoth, Lind & Ponack

[57] ABSTRACT

Disclosed is an image sensor including a circuit board, an array of light emitting elements for emitting light to an image plane, an array of light receiving elements for receiving image information transmitted by reflected light from the image plane, and plural pairs of light wave guides interposed between the light emitting elements and the image plane and between the image plane and the light receiving elements. Both the light emitting elements and the light receiving elements are mounted on the same surface of the circuit board.

4 Claims, 2 Drawing Sheets

IMAGE SENSOR HAVING LIGHT GUIDES FOR COMMUNICATION WITH IMAGE PLANE

BACKGROUND OF THE INVENTION

1. Field of the Invention

The present invention relates to an image sensor for use in a facsimile machine, an image scanner, or the like.

2. Description of the Prior Art

An image sensor generally includes an array of light receiving elements, for example photosensors, for dividing an image into fine pixels and reads image information by scanning such an array along the image plane. To accurately read the image information, a light emitting mechanism is required which emits a sufficient amount of light to the image plane. The light emitting mechanism provided in conventional image sensors generally includes an array of light emitting elements, for example LEDs (light emitting diodes), along with an array of light receiving elements. In this mechanism, lights emitted from the light emitting elements are initially reflected by the image plane and then inputted into the light receiving elements.

FIG. 1 depicts the structure of a conventional image sensor having an array of photosensors 1 mounted on a circuit board 2. The light receiving surface of each photosensor 1 confronts one end of a light wave guide 3, which comprises a core 3a for guiding light and a cladding 3b covering the core 3a. The light wave guides 3 are placed substantially vertically and the other ends thereof are disposed in close proximity to the image plane of an original document 4. The light wave guides 3 are mounted on a base 6 of the image sensor.

An array of LEDs 5 is mounted on a separate circuit board 5a from the circuit board 2 and placed beside the light wave guides 3. The LEDs 5 are orientated obliquely downwards towards the other ends of respective light wave guides 3 so as to effectively emit lights to the image plane of the document 4 placed immediately below them. The lights reflected by the image plane are then properly inputted into the light wave guides 3. To obliquely place the LEDs 5, the LEDs 5 and the circuit board 5a are mounted on an inclined surface of the base 6. The circuit board 2, on which the photosensors 1 are mounted, is mounted on the upper surface of the base 6 by means of screws 2a or any other suitable means. A cover 6a is attached to the base 6 to cover the photosensors 1 and the circuit board 2.

The above-described conventional image sensor inevitably requires two kinds of circuit boards 2 and 5a, on which the LEDs 5 and the photosensors 1 are separately mounted and which must be placed apart from each other. Accordingly, the cost of parts becomes high, and the manufacturing process of the image sensor, for example the assembling of the circuit boards 2 and 5a, electric wiring therefor, or the like, takes a lot of labor.

SUMMARY OF THE INVENTION

The present invention has been developed to overcome the above-described disadvantages.

It is accordingly an object of the present invention to provide an image sensor having an array of light emitting elements and that of light receiving elements, which is simple in construction and stable in functioning, and can be readily manufactured and assembled at a reduced cost.

In accomplishing this and other objects, an image sensor according to the present invention includes a circuit board, at least one light emitting element for emitting light to an image plane, at least one light receiving element for receiving image information transmitted by reflected light from the image plane, a first light wave guide means interposed between the light emitting element and the image plane, and a second light wave guide means interposed between the image plane and the light receiving element. Both the light emitting element and the light receiving element are mounted on the same surface of the circuit board.

In the conventional arrangement, the light emitting element and the light receiving element are mounted on two separate circuit boards whereas these elements can be mounted on the same surface of a single circuit board in the present invention.

However, in the arrangement in which both the light emitting element and the light receiving element are simply juxtaposed with each other, light emitted downwards from the light emitting element scatters therearound. As a result, reflected light from the image plane, which enters the first light wave guide means for the light emitting element, is weakened, thus resulting in poor image reading.

To overcome such a problem, the present invention provides the arrangement in which the first and second light wave guide means are placed between the light emitting element and the image plane and between the image plane and the light receiving element, respectively. The communication between the light emitting element and the image plane via the first light wave guide means enables the effective application of light from the light emitting element to a target region of the image plane. The communication between the image plane and the light receiving element via the second light wave guide means can ensure the introduction of reflected light from the image plane to the light receiving element and the reliable image reading.

Preferably, a light wave guiding path formed by the first light wave guide means is enlarged in cross section from the light emitting element towards the image plane.

This construction can make the distribution of light applied to the image plane by the light emitting element uniform.

For example, when an image of a given width and a certain length is read at one time by an array of light receiving elements and light emitting elements, it is necessary to uniformly apply light to the entire region to be read. If the light wave guiding path is a path merely transmitting light from one end to the other end, the image plane immediately below the light emitting element can receive strong light but the amount of light becomes small at an intermediate portion between adjoining light emitting elements, thus producing an unevenness of light on the image plane and lowering the quality of the image to be read by the light receiving elements.

In the image sensor according to the present invention, light can be uniformly applied to the entire image plane by enlarging the light wave guiding path in cross section from the side of the light emitting element to the side of the image plane.

When the first light wave guide means comprises a plurality of light wave guide members, outer light wave guide members have respective ends greater in size than those of inner light wave guide members so that highly uniform light may be applied to the entire image plane.

Furthermore, the brightness of the entire image plane can be made uniform even when the distance between the light emitting elements is extended. Accordingly, the number of the light emitting elements required for reading an image of a given width can be reduced.

BRIEF DESCRIPTION OF THE DRAWINGS

This and other objects and features of the present invention will become more apparent from the following description of a preferred embodiment thereof with reference to the accompanying drawings, throughout which like parts are designated by like reference numerals, and wherein:

FIG. 3b is a graph indicative of the brightness of an image plane in the construction of FIG. 3a;

DETAILED DESCRIPTION OF THE PREFERRED EMBODIMENT

Figure 1:
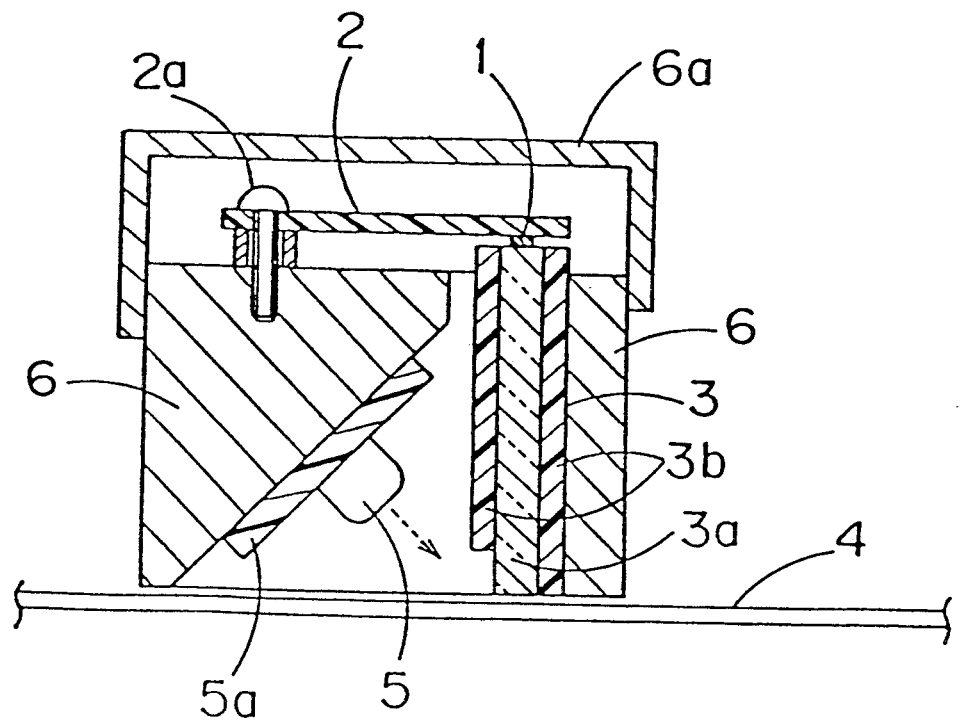
FIG. 1 is a schematic cross-sectional view of a conventional image sensor.
Figure 2:
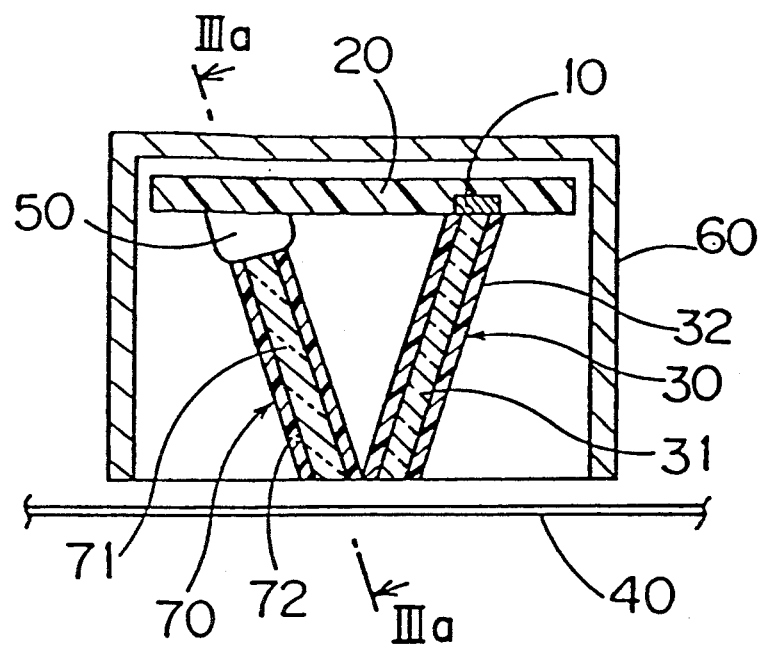
FIG. 2 is a schematic cross-sectional view of an image sensor according to the present invention.

Referring now to the drawings, there is shown in FIG. 2 an image sensor according to the present invention, which includes a circuit board 20, an array of light receiving elements 10 such as photosensors, and an array of light emitting elements 50 such as LEDs. Both the light receiving elements 10 and the light emitting elements 50 are securely mounted on the circuit board 20 and spaced a certain distance from each other. The array of the light receiving elements 10 and that of the light emitting elements 50 extend in parallel with each other in a direction perpendicular to the plane of FIG. 2. The light receiving surface of each light receiving element 10 confronts one end of a light wave guide 30, the other end of which is placed in close proximity to an image plane of an original document 40. The light wave guide 30 comprises a core 31, interposed between the light receiving surface of the light receiving element 10 and the image plane, for guiding light and a cladding 32 covering the core 31. Image information from the image plane is inputted into the light receiving element 10 through the core 31.

Any other suitable electronic elements as employed in the conventional image sensors or any other known electronic appliances can be used, as well as the above-described LEDs or photosensors, as the light receiving elements 10 or the light emitting elements 50.

Any other suitable members having a construction and made of a material as similar to those employed in various optical devices to constitute a light wave guiding path can be used as the light wave guide 30. For example, the light wave guide 30 is constituted by a plurality of rod-like core members made of a transparent material such as glass, a macromolecular material, or the like and having a large index of refraction and a cladding having a small index of refraction and encircling all the core members. Light entering one end of the core 31 is entirely reflected at a boundary surface between the core 31 and the cladding 32 and is transmitted to the other end of the core 31. Poly-carbonate, epoxy resin, acrylic resin, glass, or the like can be used as the material of the core 31 or that of the cladding 32. The index of refraction can be made different by regulating the composition or the compounding ingredient of resin or glass. A light absorbing material or a light dispersing material may be mixed into the cladding 32.

The light wave guide 30 made of the above-described material is manufactured using a molding technique or a thin film processing technique for resin or glass, as similar to the ordinary light wave guides.

In the illustrated embodiment, the light wave guide 30 extends slightly obliquely downwards from the lower surface of the circuit board 20, as viewed in FIG. 2. It is to be noted that in the embodiment, although the light wave guide 30 is securely mounted on the surface of the circuit board 20, it may be carried by a support member or a base (not shown) of resin or the like.

The light emitting element 50 is mounted on the lower surface of the circuit board 20 so as to emit light obliquely downwards, as viewed in FIG. 2. A light wave guide 70 extends from the lower surface of each light emitting element 50 in a direction of travel of the light emitted from the light emitting element 50. The lower end of the light wave guide 70 is placed in close proximity to the image plane and the lower end of the light wave guide 30 for the corresponding light receiving element 10. As a result, each pair of the light wave guides 30 for the light receiving elements 10 and the light wave guides 70 for the light emitting elements 50 is substantially in the form of a figure "V".

Figure 3A:
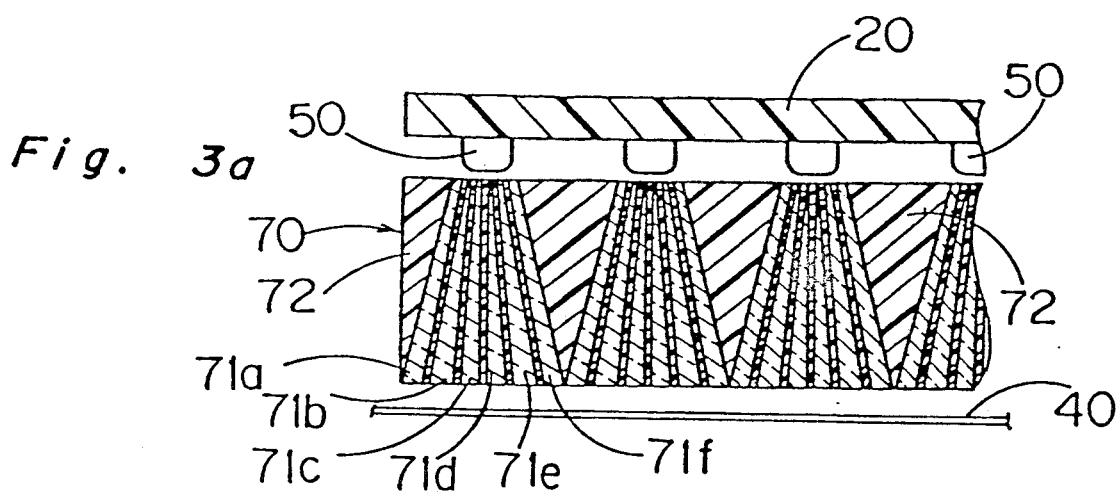
FIG. 3a is a schematic sectional view taken along line IIIa—IIIa in FIG. 2.

As shown in FIG. 3a, each of the light wave guides 70 for the light emitting elements 50 has a plurality of light wave guiding paths constituted by a plurality of core members 71a-71f and aligned in a direction of array of the light emitting elements 50. The core members 71a-71f have respective lower ends having the same sectional area on the side of the original document and taper linearly towards the light emitting element 50 to the extent of being substantially the same as the width of the light emitting element 50. The upper ends of the outer two core members 71a and 71f have the same sectional area greater than those of any other core members 71b-71e whereas the upper ends of the inner two core members 71c and 71d have the smallest sectional area so that substantially uniform lights may be applied to the original document through the core members 71a-71f.

Figure 3B:
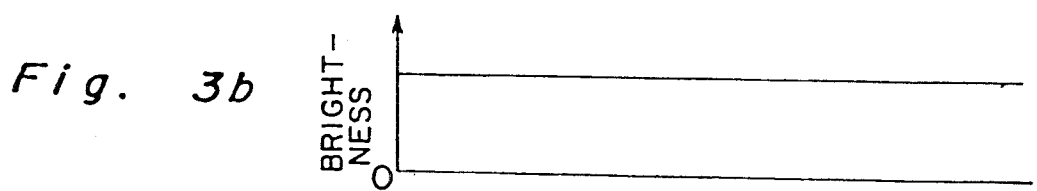

FIG. 3b is a graph indicative of the distribution of brightness on the original document. It is known from this graph that the entire image plane is uniform in brightness and a sufficient brightness is present even at a location between the light emitting elements 50.

The above-described light wave guide 70 is compared hereinafter with a conventionally known light wave guide in the form of a sheet.

Figure 4A:
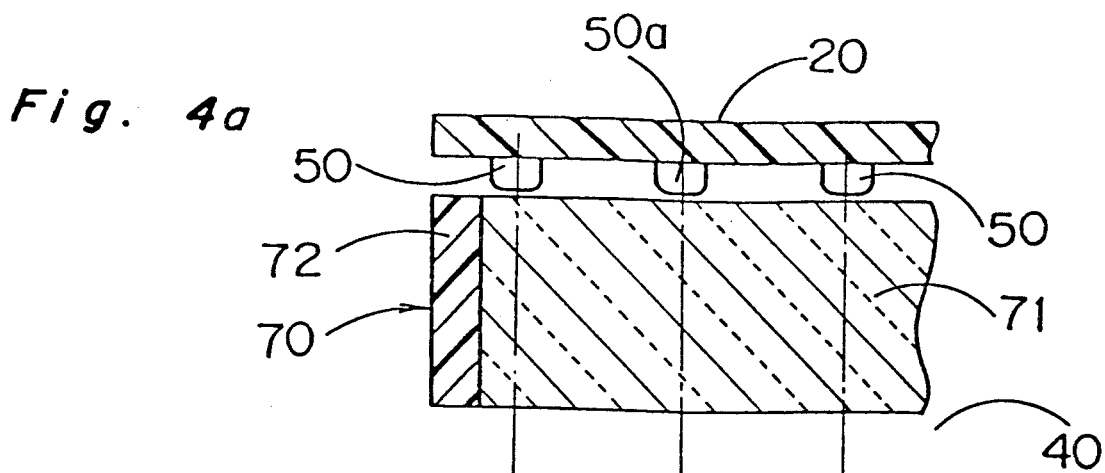
FIG. 4a is a schematic sectional view of an image sensor having a construction different from the image sensor of FIG. 2.

FIG. 4a shows the state in which a light wave guide having a conventional construction is used as the light wave guide 70 for the light emitting elements 50. This light wave guide 70 has a core 71 in the form of a sheet and a cladding 72 formed so as to encircle the periphery thereof.

Figure 4B:
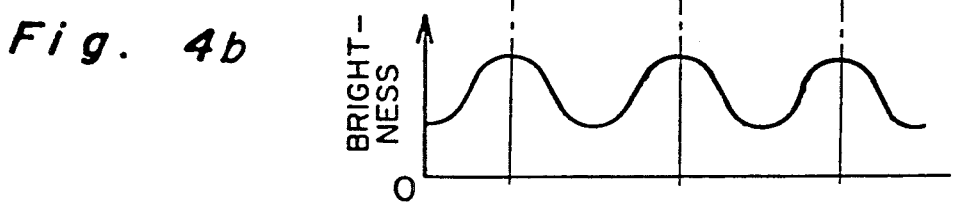
FIG. 4b is a graph indicative of the brightness of an image plane in the construction of FIG. 4b.

FIG. 4b is a graph similar to FIG. 3b in the case where such a light wave guide 70 is used. It is known from this graph that although a sufficient brightness is present at the locations below the light emitting elements 50 and 50a, the amount of light is relatively small at the location below an intermediate portion between the adjoining light emitting elements 50 and 50a and the brightness is uneven in the longitudinal direction of the original document.

Accordingly, as shown in FIGS. 3a and 3b, the brightness on the image plane can be uniform by enlarging the core 71, which constitutes a light wave guiding path, from the side of the light emitting element 50 towards the side of the original document and by changing the sectional area of the core members 71a-71f on the side of the original document. As a result, the quality of an image to be read can be improved. It is to be noted that the light wave guide 70 having the construction of FIG. 4a is also usable according to the object or use thereof. It is also to be noted that although six core members 71a-71f form one light emitting element 50 in FIG. 3a, the number thereof may be increased or decreased according to the object or use thereof.

In applications where the light wave guide 70 shown in FIG. 3a is employed, the distance between adjoining light emitting elements 50 can be widened so that the number of the light emitting elements 50 may be reduced. For example, light can be applied to the entire image plane using a single light emitting element 50.

In the image sensor according to the present invention, light emitted from the light emitting element 50 is directed obliquely downwards to the image plane through the light wave guide 70, and the light reflected by the image plane is directed obliquely upwards to the light receiving element 10 through the light wave guide 30 so that the image may be read.

Preferably, the lower end of the core 31 of the light wave guide 30 may be partially uncovered by cutting out a portion of the cladding 32 or the lower end of the core 31 may be obliquely cut out, thereby facilitating the introduction of light into the light wave guide 30. Furthermore, the provision of a semicircular lens at a location close to the lower end of the light wave guide 30 or 70 can converge or deflect light to be applied to the original document or light reflected by the original document so that the application of light or the image reading may be effectively performed. The lower ends of the light wave guides 30 and 70 may be coated with a hard coating material or covered with respective thin protective glass layers. In this case, the lower ends of the light wave guides 30 and 70 are never worn out even if they are brought into contact with the original document.

The image sensor according to the present invention is applicable to a facsimile machine, an image scanner, a copier or any other apparatus in which an image is electronically treated.

According to the present invention, the number of the circuit boards can be reduced because both the light emitting elements and the light receiving elements are mounted on the same surface of the circuit board, thus remarkably reducing the cost of parts and the assembling cost.

Furthermore, the provision of the light wave guides between the light emitting elements and the image plane and between the image plane and the light receiving elements can ensure the accurate and effective application of light from the light emitting elements to a target location on the image plane, thereby considerably improving the image quality.

In addition, even if the distance between the light emitting elements is extended, the image quality is hardly lowered in the arrangement according to the present invention, and therefore, the number of the light emitting elements can be reduced as compared with the conventional image sensor. Because of this, the light emitting elements and the circuit board, on which the light emitting elements are mounted, can be simplified in construction and the manufacturing cost thereof can be reduced.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. An image sensor comprising:
   a circuit board;
   at least one light emitting element, mounted on one surface of said circuit board, for emitting light to an image plane;
   at least one light receiving element, mounted on said surface of said circuit board, for receiving image information transmitted by reflected light form the image plane;
   a first light wave guide means interposed between said light emitting element and said image plane; and
   a second light wave guide means interposed between said light receiving element and a position at said image plane where it will pick up light form said first light wave guide means which is reflected at the image plane, said first light wave guide means having a light wave guiding path which is enlarged in cross section from said light emitting element towards said image plane.

2. The image sensor according to claim 1, wherein said first light wave guide means comprises a plurality of light wave guide members positioned in a line and wherein the light wave guide members at the ends of the line have respective ends greater in size than those of the light wave guide members in the middle of the line.

3. The image sensor according to claim 1, wherein said first light wave guide means and said second light wave guide means are inclined in opposite directions with respect to said image plane.

4. The image sensor according to claim 1, wherein said first and second light wave guide means are positioned substantially in the form of a figure "V" with the apex adjacent the image plane.

* * * * *